(12) United States Patent
Minami et al.

(10) Patent No.: US 6,213,496 B1
(45) Date of Patent: Apr. 10, 2001

(54) AIRBAG DEVICE WITH INNER AND OUTER BAGS

(75) Inventors: Yoshihiko Minami; Yoshiyuki Nakano; Shuji Kusaka; Norihiko Kitagishi; Tadayuki Ato, all of Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/266,629

(22) Filed: Mar. 11, 1999

(30) Foreign Application Priority Data

Mar. 13, 1998 (JP) .................................................. 10-063163

(51) Int. Cl.⁷ .................................................. B60R 21/24
(52) U.S. Cl. .......................... 280/729; 280/741; 280/738
(58) Field of Search ................................. 280/729, 728.1, 280/730.1, 730.2, 748, 749, 739

(56) References Cited

U.S. PATENT DOCUMENTS

| 3,675,942 | | 7/1972 | Huber . | |
|---|---|---|---|---|
| 3,752,501 | * | 8/1973 | Daniel et al. | 280/729 |
| 5,249,824 | * | 10/1993 | Swann et al. | 280/729 |
| 5,378,011 | * | 1/1995 | Rogerson et al. | 280/728.1 |
| 5,489,117 | | 2/1996 | Huber . | |
| 5,529,337 | * | 6/1996 | Takeda et al. | 280/729 |
| 5,577,765 | * | 11/1996 | Takeda et al. | 280/729 |
| 5,599,040 | * | 2/1997 | Takahashi et al. | 280/729 |
| 5,931,497 | * | 8/1999 | Fischer | 280/743.1 |
| 5,957,485 | * | 9/1999 | Hirai | 280/729 |
| 6,086,092 | * | 7/2000 | Hill | 280/729 |

FOREIGN PATENT DOCUMENTS

| 41 26 743 | 2/1993 | (DE) . |
|---|---|---|
| 197 30 161 | 1/1999 | (DE) . |

\* cited by examiner

*Primary Examiner*—Paul N. Dickson
*Assistant Examiner*—Faye M. Fleming
(74) *Attorney, Agent, or Firm*—Kanesaka & Takeuchi

(57) ABSTRACT

An airbag device is formed of a retainer having a center opening, an air bag, and at least one inflater fixed to the retainer. The air bag includes an outer bag having an outer bag opening, and an inner bag arranged inside the outer bag and having an inner bag opening. The peripheries of the outer and inner bag openings are directly or indirectly fixed to the retainer so that the inner bag communicates with an outside through the outer bag opening and the center opening. The inflater has a main body containing a gas generating agent therein and faces a space between the outer and inner bags to directly supply gas to the space when the inflater is actuated. When the gas is supplied to the space between the outer and inner bags, air is inspired into the inner bag through the center opening.

8 Claims, 11 Drawing Sheets

AIRBAG DEVICE WITH INNER AND OUTER BAGS

FIELD OF THE INVENTION AND RELATED ART STATEMENT

The present invention relates to an airbag device installed in a vehicle. More particularly, the present invention relates to an airbag device of a so-called aspiration type, which aspirates air when an airbag is inflated with gas from an inflator.

An airbag device for protecting an occupant during a vehicle collision or roll-over is structured so that an airbag thereof is inflated with gas from an inflator. By designing the device to aspirate air into the airbag during its inflation, the inflating speed of the airbag can be increased. An airbag of such a type which aspirates air during the inflation of the airbag is sometimes called as an aspiration-type airbag.

Most of the aspiration-type airbags for drivers are structured to aspirate air through vent holes formed in the airbags. Some of the aspiration-type airbags for occupants in front passenger seats or rear seats use such vent holes. As one of the aspiration-type airbag devices for occupants in front passenger seats or rear seats, an airbag device, in which air-through openings are formed in a casing for accommodating an airbag, has been proposed.

Because the conventional airbags are designed such that gas from the inflator is supplied therein to fill the entire of the inside volume thereof, an inflator is required to have large capacity of generating gas.

OBJECT AND SUMMARY OF THE INVENTION

It is an object of the present invention to provide an airbag comprising an outer bag and an inner bag in which gas from an inflator is supplied only to a region between the outer bag and the inner bag.

An airbag of the present invention comprises: an outer bag, an inner bag arranged inside said outer bag, and a gas-introduction portion for introducing gas into a space between said outer bag and the inner bag. The inner bag is preferably provided with an opening which allows the ventilation between the inside of the inner bag and the outside of the outer bag.

An airbag device of the present invention has an airbag and an inflator for inflating said airbag wherein said airbag is the above explained airbag.

In the present invention, gas is supplied from the inflator into a space between the outer bag and the inner bag whereby the outer bag is inflated. While the outer bag is being inflated, air is aspirated into the inner bag through the opening thereof so that the inner bag is substantially inflated only with aspirated air.

DETAILED DESCRIPTION OF PREFERRED EMBODIMENTS

Figure 1:
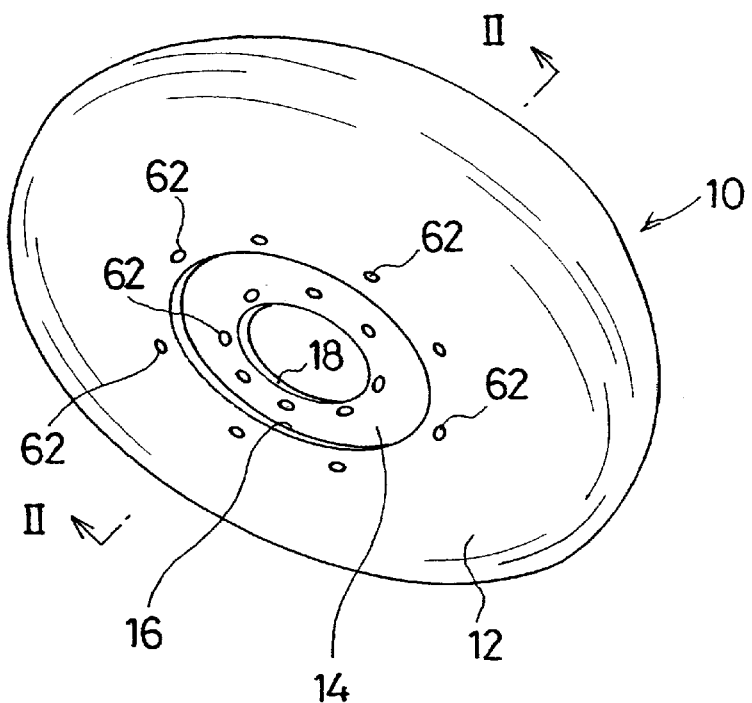
FIG. 1 is a structural view of an airbag according to an embodiment.
Figure 2:
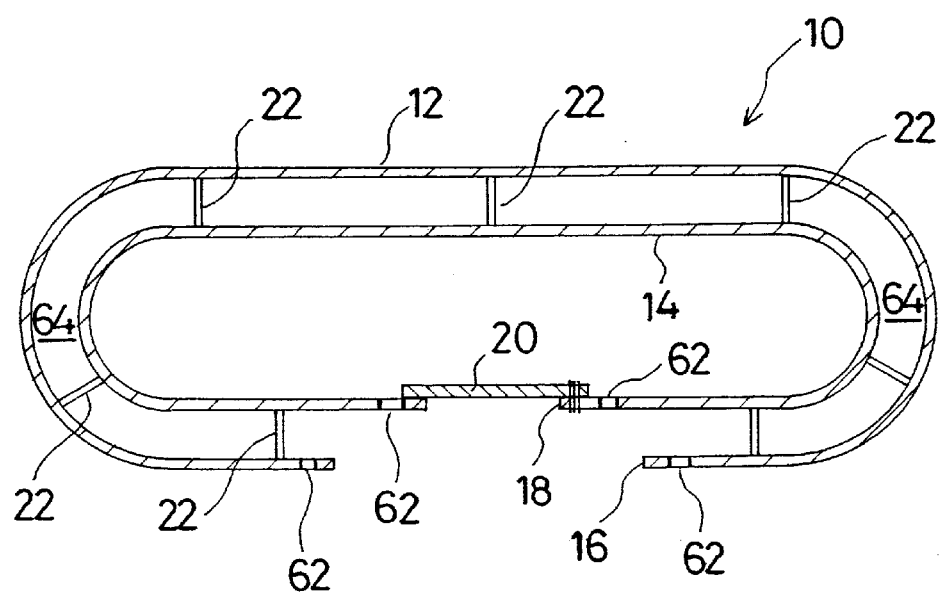
FIG. 2 is a sectional view taken along a line II—II of FIG. 1.
Figure 3:
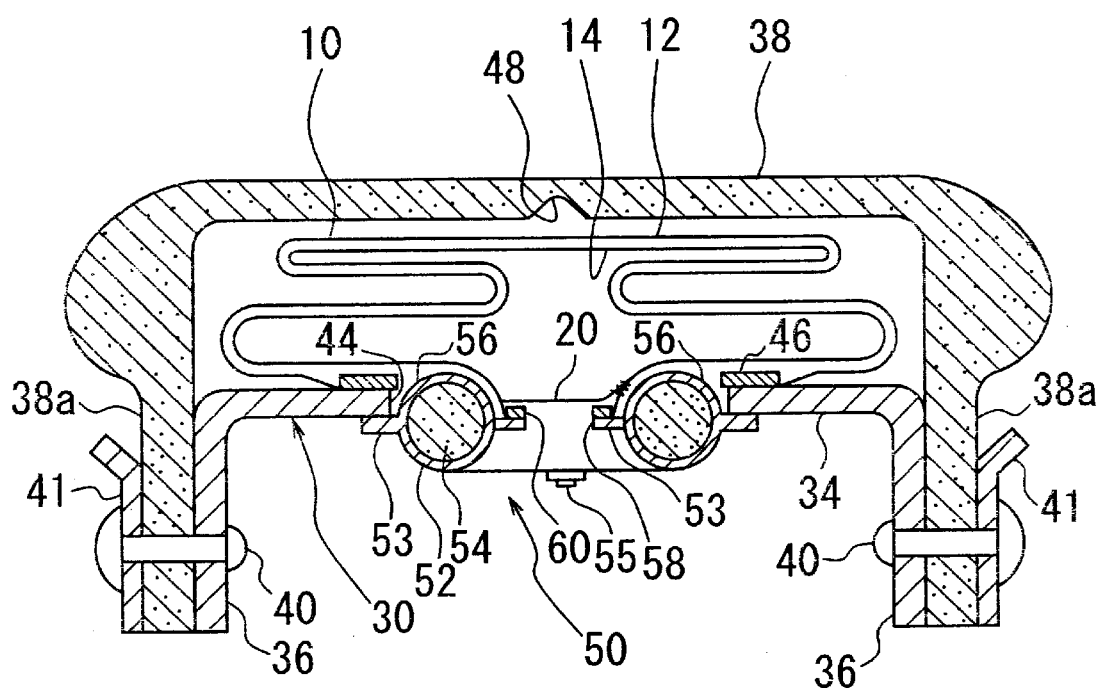
FIG. 3 is a sectional view of an airbag device according to an embodiment.
Figure 4:
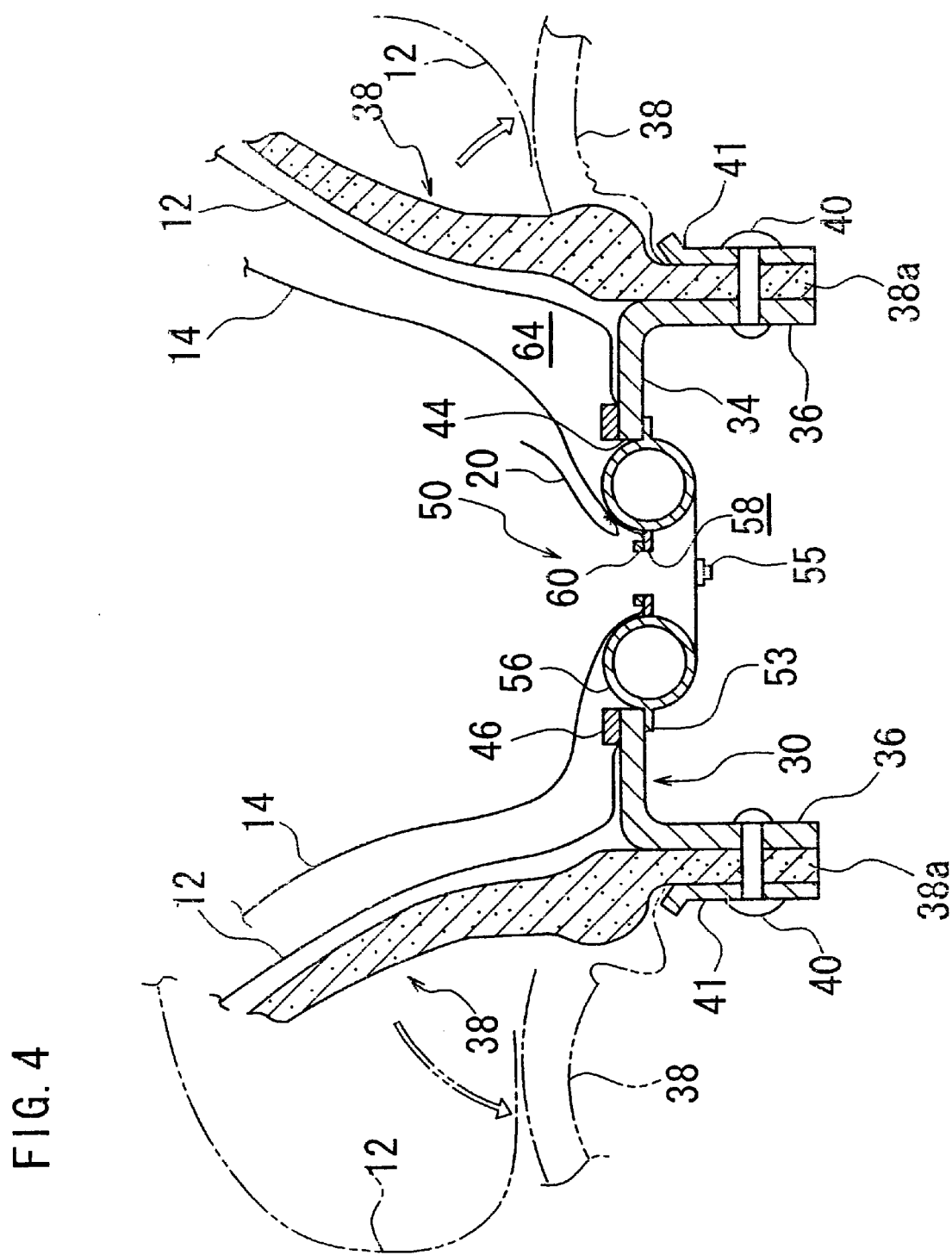
FIG. 4 is a sectional view of the airbag device of FIG. 3 in the process of inflation.
Figure 5:
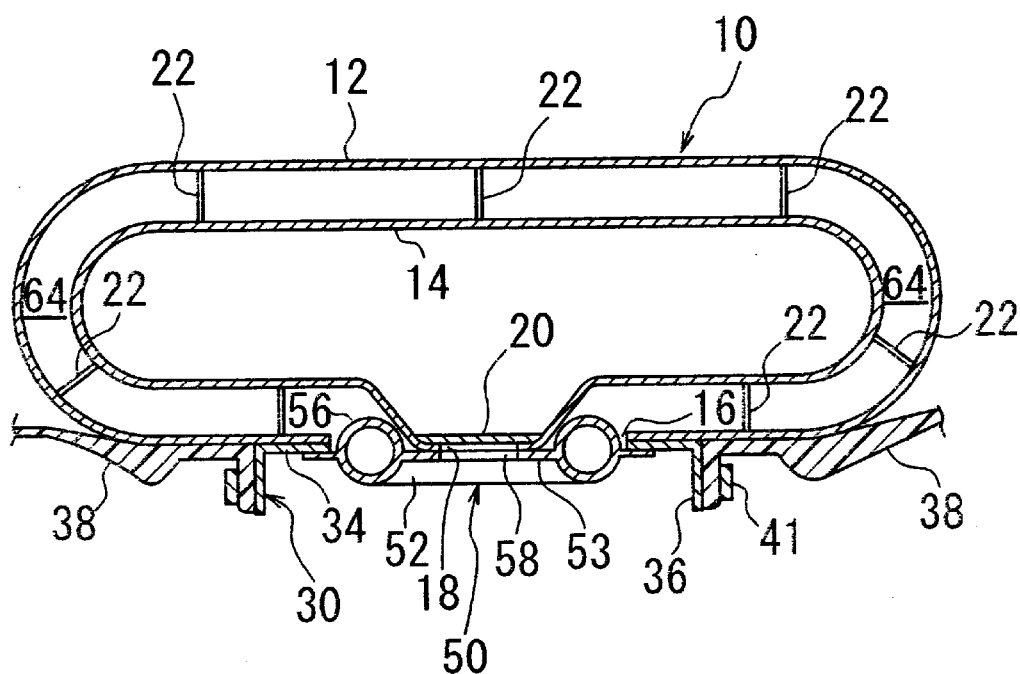
FIG. 5 is a sectional view of the airbag device of FIG. 3 in its fully deployed state.
Figure 6:
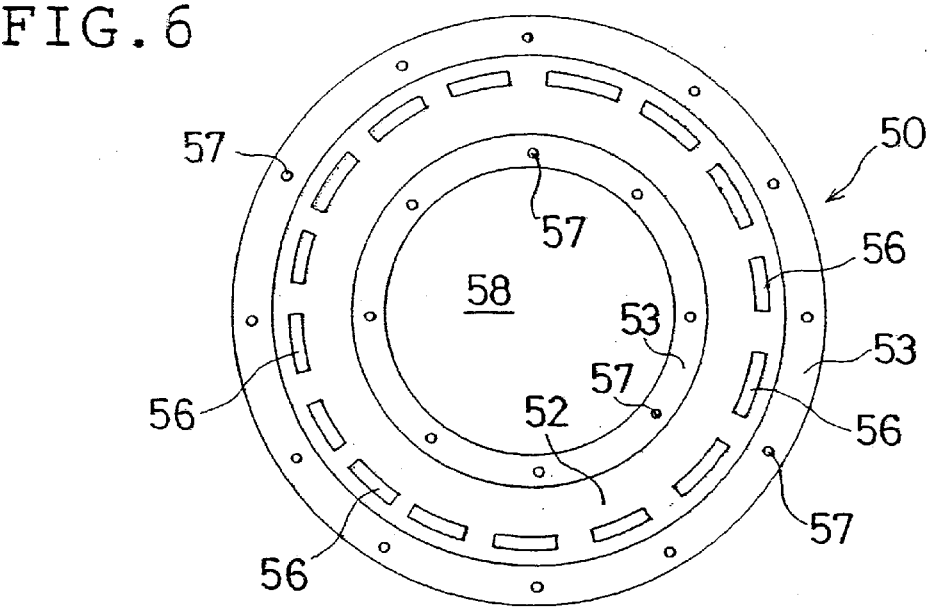
FIG. 6 is a plan view of an inflator of the airbag device of FIG. 3.

Hereinafter, embodiments of the present invention will be described with reference to attached drawings. FIG. 1 is a perspective view of an airbag according to an embodiment and FIG. 2 is a sectional view taken along line II—II of FIG. 1. FIGS. 3–5 are sectional views of a driver-side airbag device in which the airbag shown in FIGS. 1 and 2 is employed, FIG. 3 illustrates the state before the inflator is actuate, FIG. 4 illustrates the state where the inflator is in operation, and FIG. 5 illustrates the state where the airbag is completely inflated. FIG. 6 is a plan view of an inflator.

An airbag 10 has an outer bag 12 and an inner bag 14. The outer bag 12 is provided with an opening 16 through which an inflator is inserted. The inner bag 14 is provided with an opening 18 formed therein for introducing (aspirating) air. The opening 18 has a flap 20 made of a fabric or synthetic resin. The outer bag 12 and the inner bag 14 are connected to each other by tethers 22 such as cords or fabric strips. The flap 20 may be disposed to another portion such as a retainer or a casing of the airbag device.

In FIGS. 3 and 4, the retainer 30 comprises a flat plate portion 34, to which an airbag 10 is secured, and a module cover mounting portion composed of a standing piece 36 standing from the edge of the flat plate portion 34 in a direction opposite to an occupant. The airbag 10 is folded and covered by a module cover 38. The module cover 38 has a leg portion 38a in which a proximal portion is laid on the outer surface of the standing piece 36. Further, a plate 41 is laid on the outer surface of the leg portion 38a. The leg portion 38a is fixed to the retainer 30 by rivets 40 penetrating the plate 41, the leg portion 38a, and the standing piece 36.

The inflator 50 is disposed in such a manner that the upper side (front side) thereof enters in the outer bag 12 through an opening 44 formed in the flat plate portion 34 and a flange 53 is fixed to the retainer 30. The numeral 46 designates an airbag fixing member called as a ring. The periphery around the opening of the outer bag 12 of the airbag 10 is clamped between the ring 46 and the periphery of the opening 44 of the flat plate portion 34, thereby securing the outer bag 12 to the retainer 30. Bolts or rivets are inserted through the ring 46, the outer bag 12, the flat plate portion 34 of the retainer, and the flange 53, which will be described later, and are tightened up.

The numeral 48 designates a tear line formed in the module cover 38.

The inflator 50 comprises a toroidal main body 52, flanges 53 projecting from the outer periphery and the inner periphery of the main body 52, respectively, gas generating agent (propellant) 54 filled in the main body 52, and an one or a plurality of igniter 55 for igniting the gas generating agent 54. The igniter 55 may be provided.

The main body 52 is provided with a gas outlet 56 formed therein. The gas outlet 56 is composed of a plurality of holes, however, the gas outlet may be composed of a continuous slit extending all around the main body 52.

The flanges 53 have through holes 57 into which fasteners such as bolts or rivets are inserted. Formed inside the inner flange 53 of the main body 52 is an air vent hole 58.

In order to remove particles from gas, a filter is disposed along the gas outlet 56, but not shown.

The periphery of the opening 18 of the inner bag 14 is fixed to the inner flange 53 by a ring 60 and bolts or rivets. Numeral 62 designates through holes for the bolts or rivets which are formed in the outer bag 12 and the inner bag 14, respectively.

When the inflator 50 is actuated to inject gas, substantially the entire volume of gas from the inflator 50 is injected into a space 64 between the outer bag 12 and the inner bag 14, thereby inflating the outer bag 12.

The inflation of the outer bag 12 is accompanied by the inflation of the inner bag 14. During this inflation, air is aspirated into the inner bag 14 through the air vent hole 58 and the opening 18 of the inner bag 14.

Therefore, the airbag device of FIGS. 3-5 only requires the inflator 50 to inject such a volume of gas as to fill the space 64 between the outer bag 12 and the inner bag 14. In the airbag device, an inflator having a small capacity of injecting gas can be employed as the inflator 50.

When the occupant plunges into the inflated airbag 10, air in the inner bag 14 is discharged through the air vent hole 58, thereby softening the impact acting on the occupant.

Figure 7:
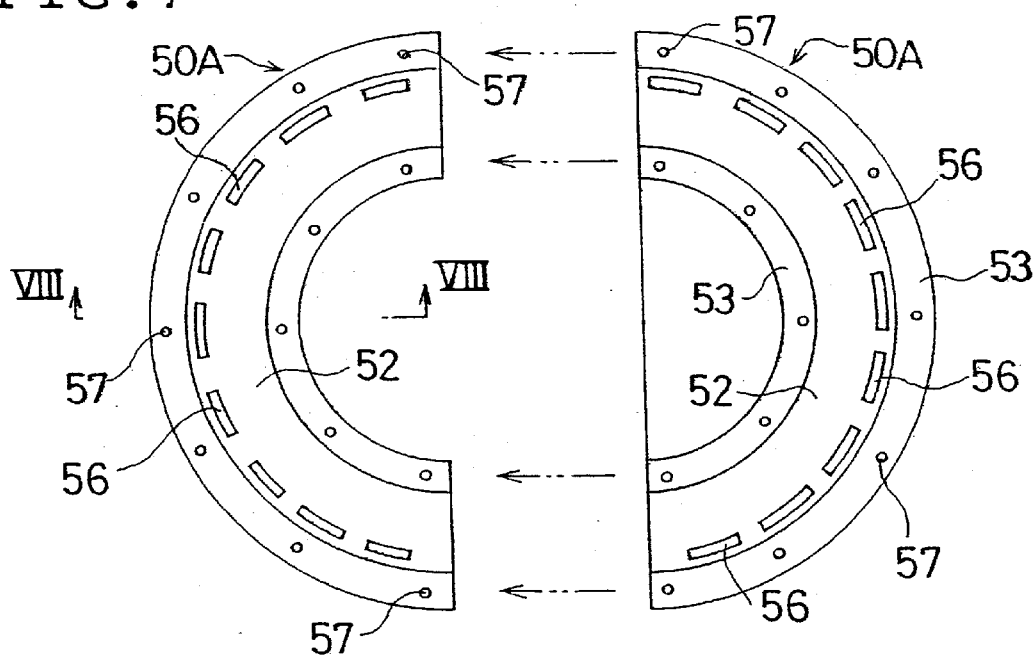
FIG. 7 is a plan view of an inflator used in an airbag device according to another embodiment.
Figure 8:
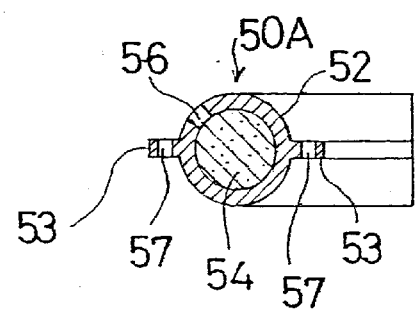
FIG. 8 is a sectional view taken along a line VIII—VIII of FIG. 7.

Though the inflator 50 is circular in the above embodiments, it may be elliptic, square, rectangular, rhomboid, or polygonal such as hexagon or octagon. Further, though the inflator 50 is annular, the inflator may be composed of plural arcuate inflators as shown in FIGS. 7 and 8. The inflators 50A shown in FIGS. 7 and 8 are semi-circular and becomes circular like the inflator 50 when combined with each other. Instead of the semi-circular inflators, various arcuate inflators such as quadrant may be employed. Also non-arcuate inflators (for example, L-like, V-like, channel-like, or short bar-like inflators) may be arranged in a circular shape. The other numerals in FIGS. 7 and 8 designate the same and corresponding parts of the inflator 50.

Figure 9:
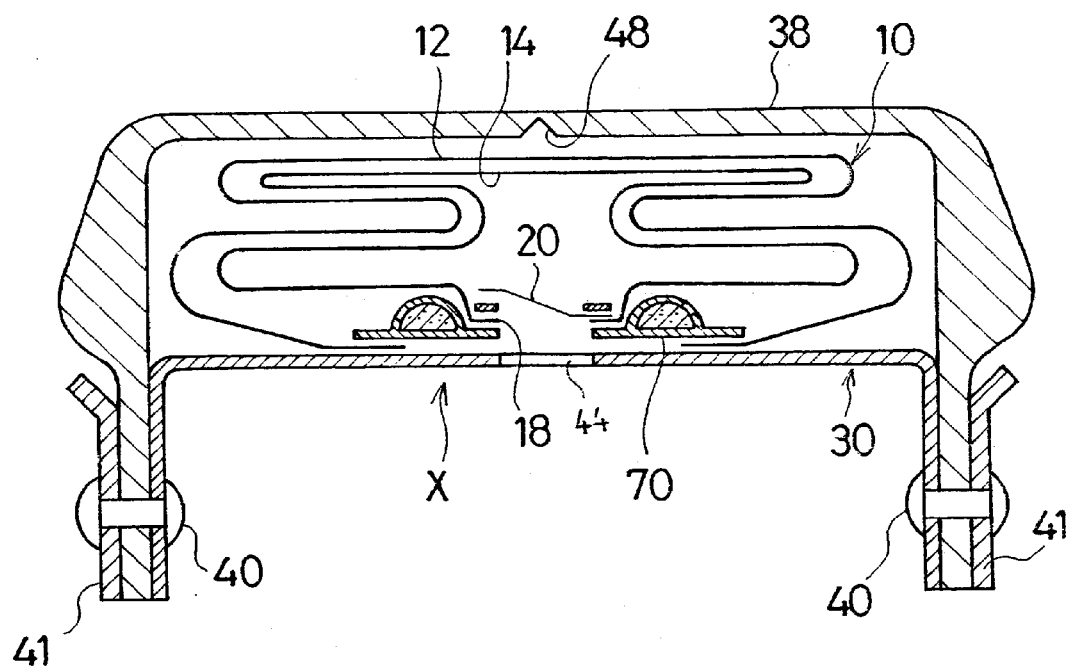
FIG. 9 is a sectional view of an airbag device according to another embodiment.
Figure 10:
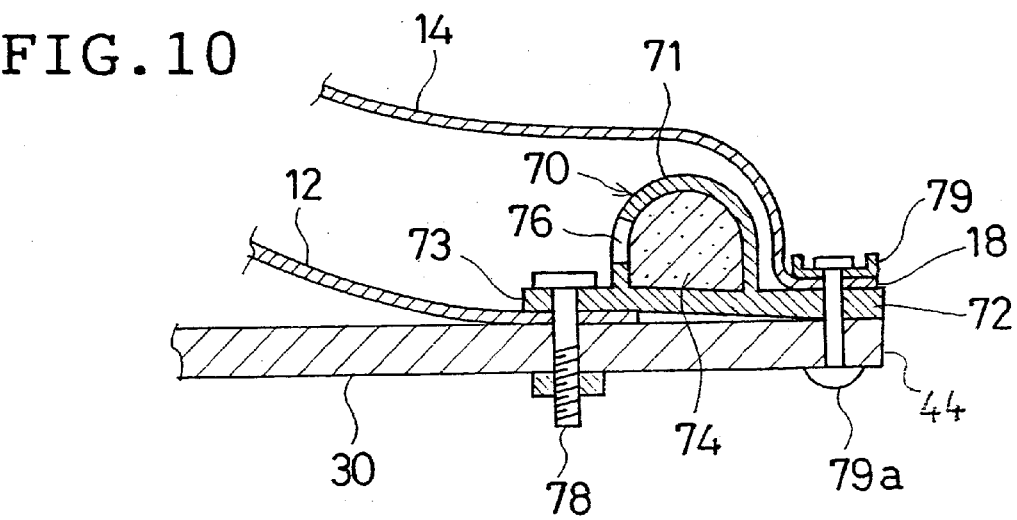
FIG. 10 is an enlarged view of a portion X of FIG. 9.
Figure 11:
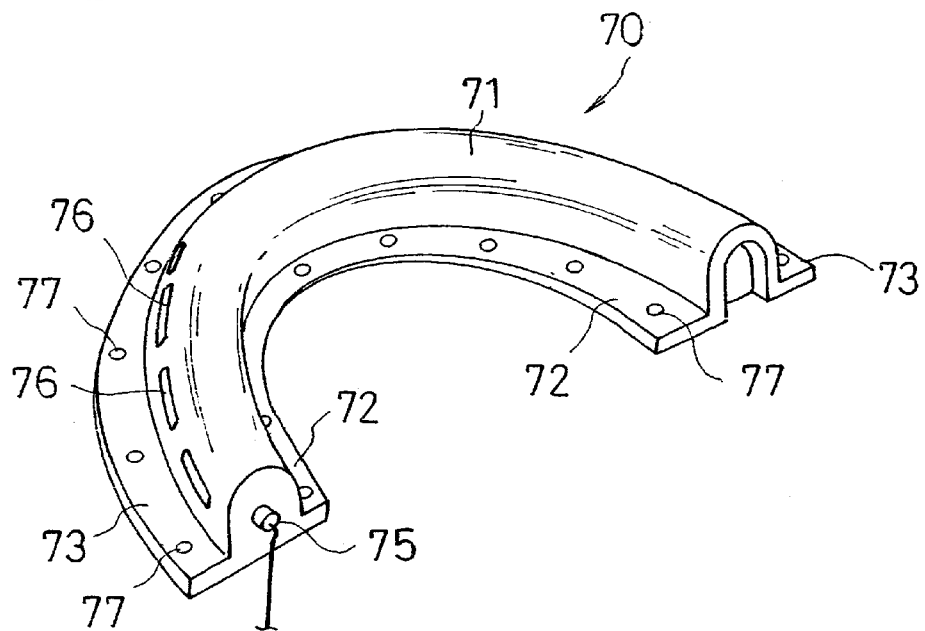
FIG. 11 is a perspective view of an inflator used in an airbag device according to another embodiment.

FIGS. 9–11 show an embodiment of an airbag device in which an inflator 70 is incorporated in an airbag 10, FIG. 9 is a sectional general view, FIG. 10 is an enlarged view of a portion X of FIG. 9, and FIG. 11 is a perspective view of the inflator 70.

As shown in FIG. 11, the inflator 70 comprises a C-like, U-like or semi-circular main body 71, flanges 72, 73 disposed on the outer periphery and the inner periphery of the main body 71, respectively, propellant 74 within the main body 71, and an igniter 75. Numeral 76 designates a gas outlet and 77 designates through holes for bolts or rivets.

As shown in FIG. 10, the periphery of the outer bag 12 is clamped between the outer flange 73 and a retainer 30 and fixed by bolts 78.

The periphery of the inner bag 14 is laid on the inner flange 72, clamped between the inner flange 72 and a ring 79, and secured to the retainer 30 by rivets 79a.

Also in this case, as the inflator 70 is actuated, gas injected through a gas outlet 76 of the inflator 70 enters into the space 64, thereby inflating the outer bag 12. Into the inner bag 14, air is aspirated through an opening 44 of the retainer 30 and the opening 18 of the inner bag 14.

Figure 12:
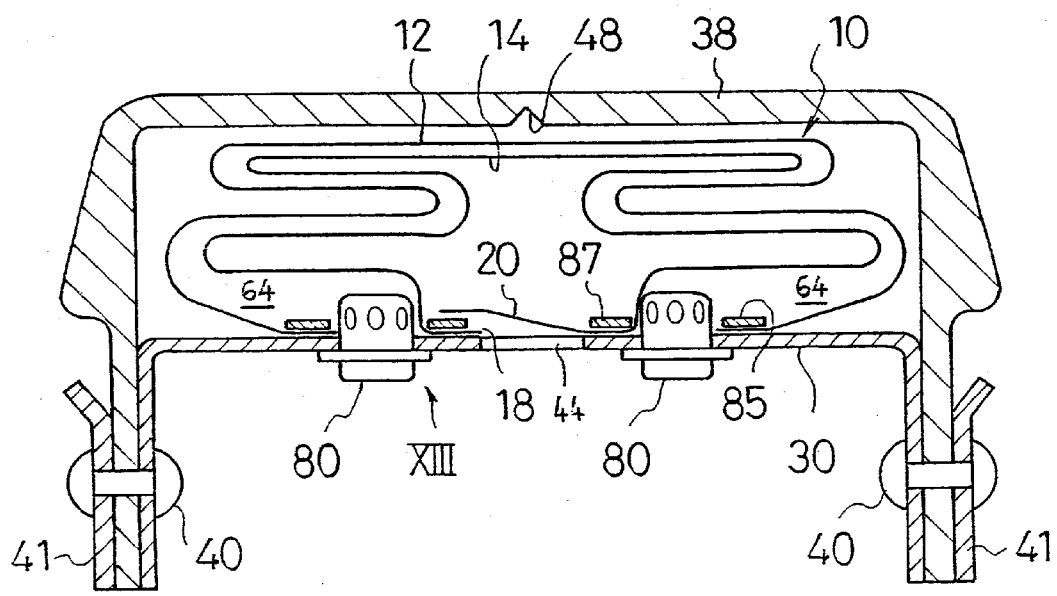
FIG. 12 is a sectional view of an airbag device according to further another embodiment.
Figure 13:
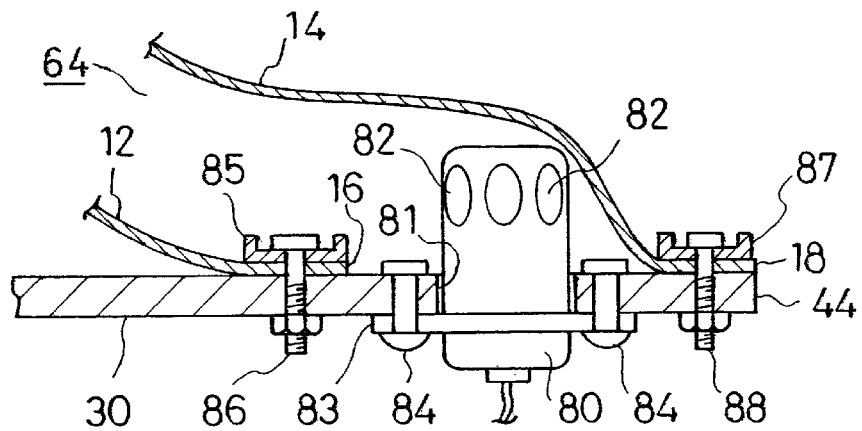
FIG. 13 is an enlarged view of a portion XIII of FIG. 12.
Figure 14:
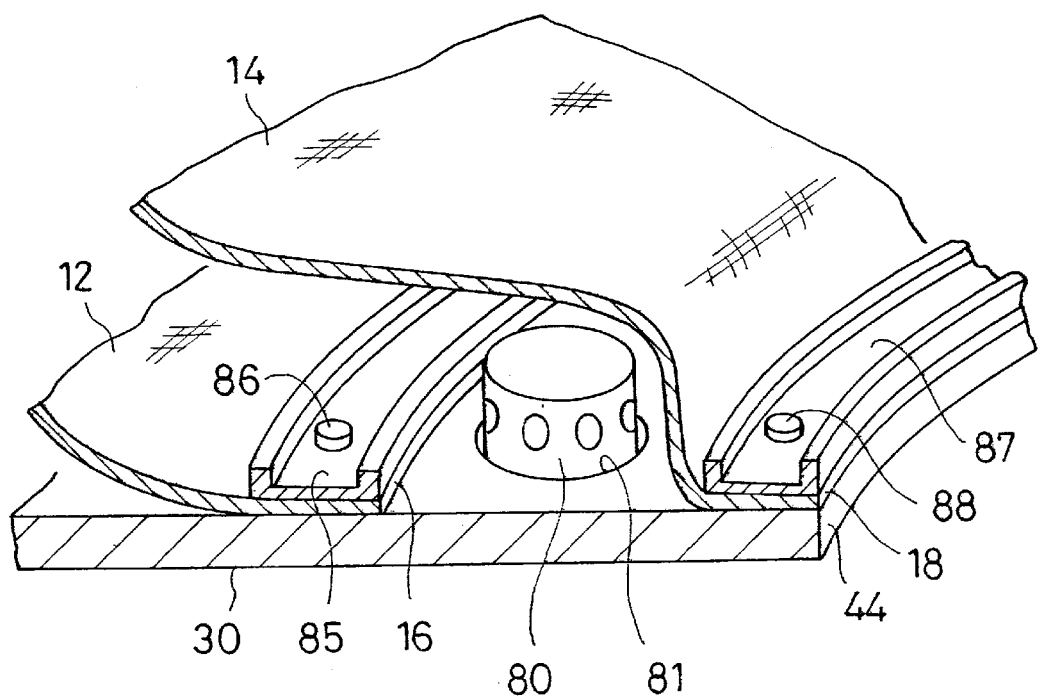
FIG. 14 is a perspective view of the portion XIII of FIG. 12.

FIGS. 12–14 show an airbag device in which a plurality of small inflators 80 is arranged. The inflators 80 are inserted through openings or side openings 81 formed in the retainer 30 such that upper portions of the inflators 80 project and are designed to inject gas into the space 64 between the outer bag 12 and the inner bag 14 through gas outlets 82 thereof. Numeral 83 designates a flange of each inflator 80 which is fixed to the retainer 30 by rivets 84.

The periphery of the opening 16 of the outer bag 12 is fixed to the retainer 30 by a ring or outer ring 85 and bolts 86 and the periphery of the opening 18 of the inner bag 14 is fixed to the retainer 30 by a ring or inner ring 87 and bolts 88.

When the inflators 80 are actuated, gas enters into the space 64 through gas outlets 82 so as to inflate the outer bag 12. Into the inner bag 14, air is aspirated through an opening 44 of the retainer 30 and the opening 18 of the inner bag 14.

Instead of the inflators 80, small inflators in various configurations (for example, bar-like inflators) may be secured to the retainer 30.

Figure 15:
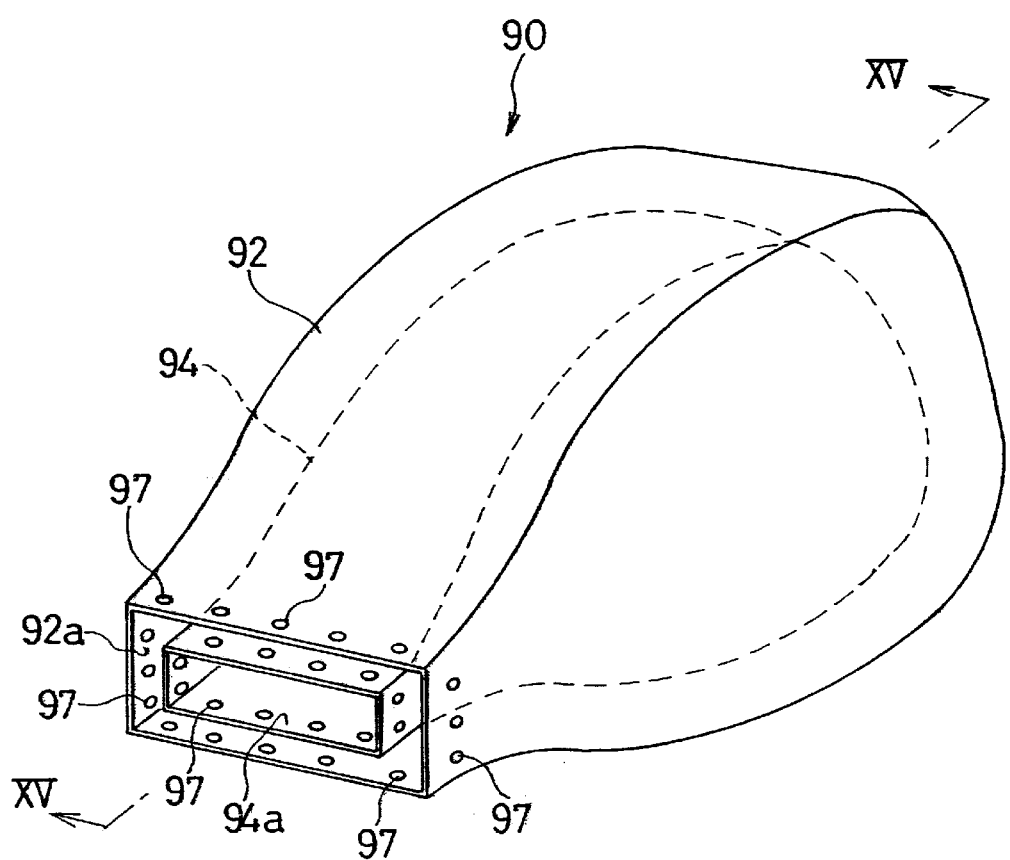
FIG. 15 is a perspective view of a passenger-side airbag according to an embodiment.
Figure 16:
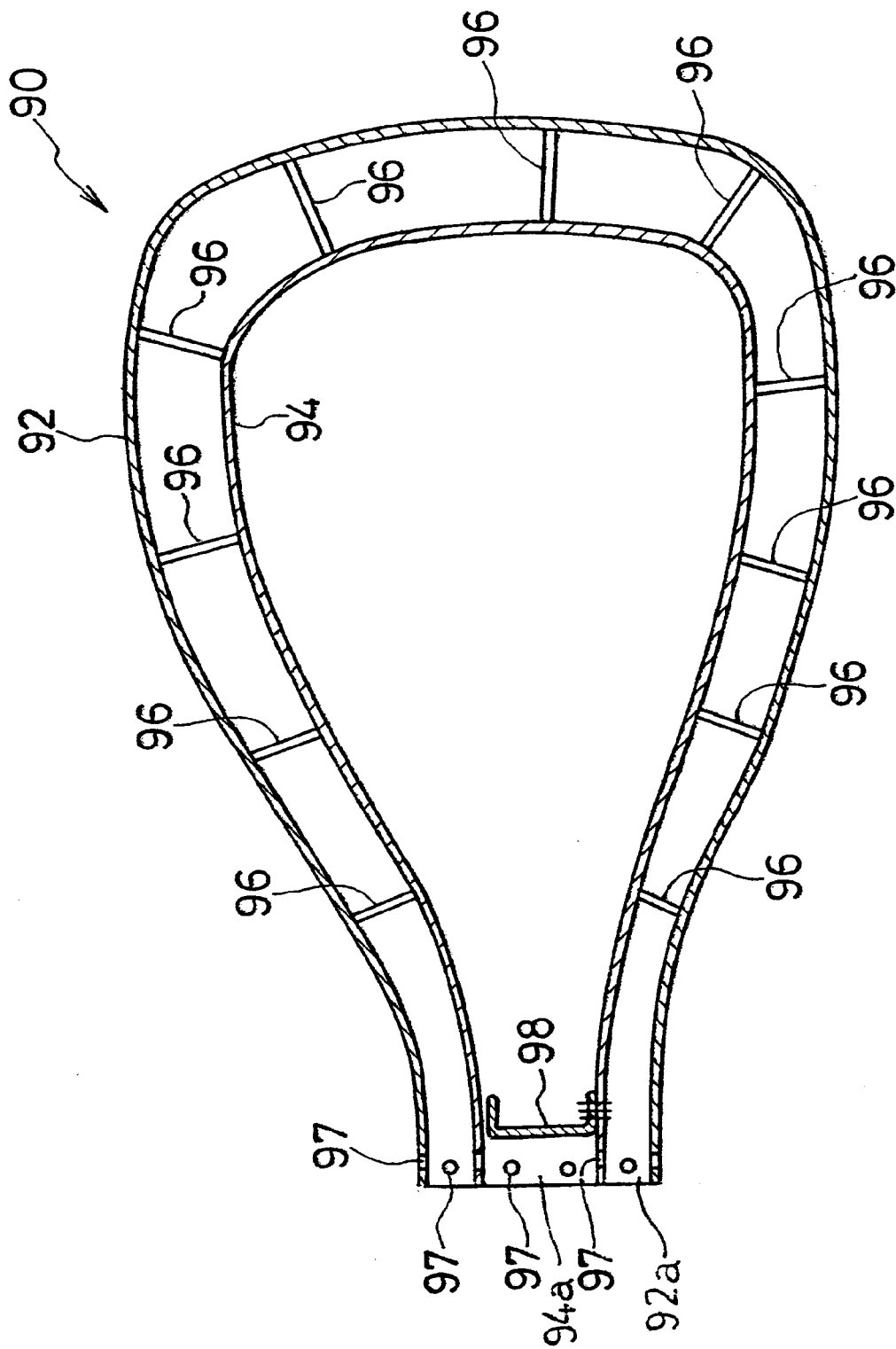
FIG. 16 is a sectional view taken along a line XVI—XVI of FIG. 15.
Figure 17:
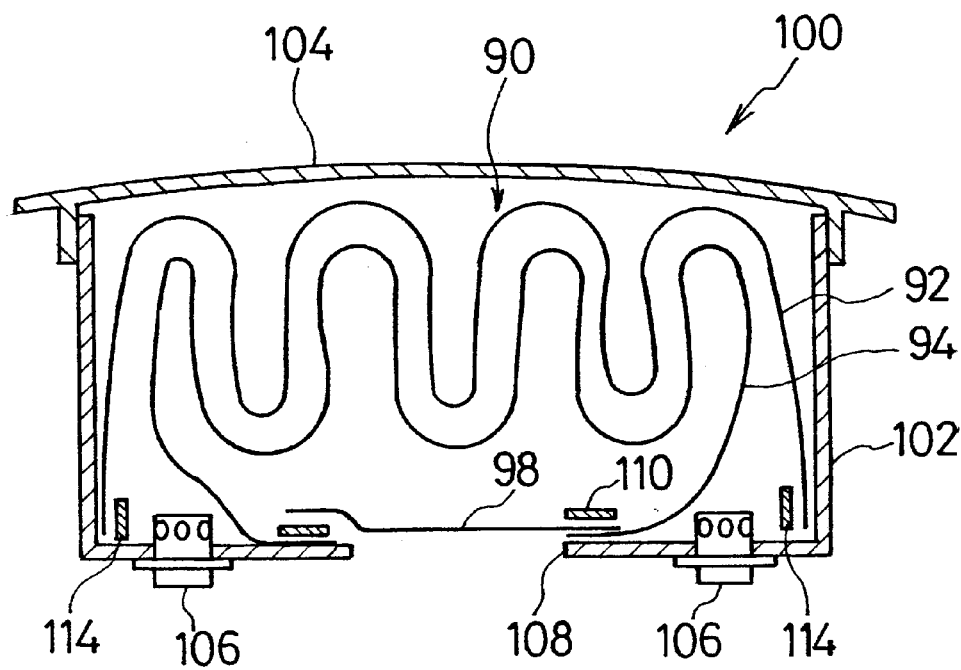
FIG. 17 is a sectional view of the passenger-side airbag according to the embodiment.
Figure 18:
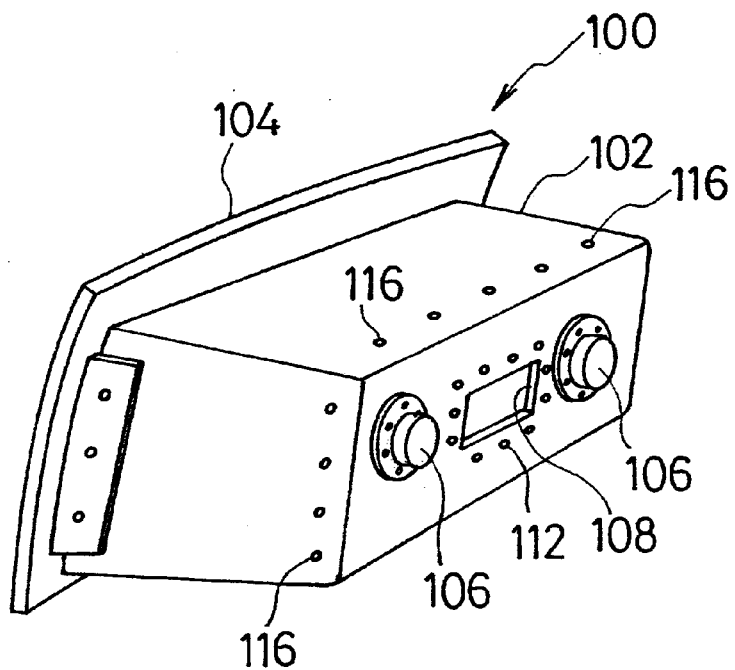
FIG. 18 is a perspective view of the passenger-side airbag according to the embodiment.

FIGS. 15 and 16 are a perspective view and a sectional view of an airbag for a front passenger or a rear passenger. FIGS. 17 and 18 are a sectional view and a perspective view of a passenger-side airbag device in which the airbag is employed.

An airbag 90 comprises an outer bag 92 and an inner bag 94 which are connected to each other by tethers 96 such as cords or fabric strips. The respective peripheries of openings 92a, 94a of the outer bag 92 and inner bag 94 are provided with through holes 97 for bolts or rivets. The opening 94a of the inner bag 94 has a flap 98 of a fabric piece. One side of the flap 98 is connected to the bag 94 by sewing or adhesion.

In this airbag 90, the outer bag 92 is inflated by supplying gas into a space between the outer bag 92 and the inner bag 94. During this inflation, the flap 98 opens inwardly and air is aspirated into the inner bag 94 through the opening 94a.

As shown in FIGS. 17 and 18, an passenger-side airbag device 100 comprises a casing 102 called as a container, the aforementioned airbag 90 folded and accommodated within the casing 102, a lid 104 attached to the front surface of the casing 102, and inflators 106 arranged in a rear portion of the casing 102.

The back surface of the casing 102 is provided with a vent hole 108. The periphery of the opening 94a of the inner bag 94 of the airbag 90 is secured to the periphery of the vent hole 108 by a frame-like mounting bracket 110 and rivets 112. The periphery of the opening 92a of the outer bag 92 is fixed to sides, the top, and the bottom of the casing 102 by an elongated plate-like mounting brackets 114 and rivets 116.

When the inflators 106 are actuated, gas is injected into the space between the outer bag 92 and the inner bag 94, thereby inflating the airbag 90 as shown in FIG. 16. During the inflation of the airbag 90, the lid 104 opens and the airbag 90 is inflated toward the front of the casing 102 as shown in FIG. 16. While the outer bag 92 is inflated with gas, air is aspirated into the inner bag 94 through the vent hole 108 and the opening 94a.

Therefore, the airbag 90 can be inflated sufficiently and quickly by the inflators 106 of small capacities.

When the occupant plunges into the inflated airbag 90, air in the inner bag 94 is discharged through the opening 94a, thereby softening the impact acting on the occupant.

The present invention can be applied to not only a driver airbag device, a front passenger or rear passenger airbag device but also a side airbag device which is disposed on a side of an occupant and an airbag device for protecting the head of the occupant.

In the present invention, the inner bag and the outer bag may be connected directly to each other not using the tethers 22, 96.

As described above, the airbag of the present invention can be sufficiently and quickly inflated by an inflator of small capacity. The airbag device of the present invention is provided with this airbag, so can employ an inflator of small capacity.

What is claimed is:

1. An airbag device comprising:

a retainer having a center opening, an airbag including an outer bag having an outer bag opening with a periphery, and an inner bag arranged inside the outer bag and having an inner bag opening with a periphery, said peripheries of the outer and inner bag openings being directly or indirectly fixed to the retainer so that the inner bag communicates with an outside of the airbag through the center opening of the retainer, and at least one inflator directly fixed centrally on the retainer and having a main body containing a gas generating agent therein, said main body facing a space between the outer and inner bags to directly supply to the space gas when the at least one inflator is actuated so that air is inspired inside the inner bag through the inner bag opening and the center opening.

2. An airbag device comprising:

a retainer having a center opening, an airbag including an outer bag having an outer bag opening with a periphery, and an inner bag arranged inside the outer baa and having an inner bag opening with a periphery, said peripheries of the outer and inner bag openings being directly or indirectly fixed to the retainer so that the inner bag communicates with an outside of the airbag through the center opening of the retainer, and at least one inflator directly fixed to the retainer adjacent the center opening and having an annular shape with an air vent hole in a middle thereof and a main body containing a gas generating agent therein, said main body facing a space between the outer and inner bags to directly supply to the space gas when the at least one inflator is actuated so that air is inspired inside the inner bag through the inner bag opening and the center opening.

3. An airbag device according to claim 2, wherein said at least one inflator or has an outer flange extending outwardly from the main body and fixed to the retainer, and an inner flange extending inwardly from the main body and fixed to the periphery of the inner bag.

4. An airbag device according to claim 3, wherein said airbag further includes a flap fixed to the inner bag at the air vent hole to open inwardly and outwardly of the inner bag.

5. An airbag device according to claim 3, wherein said at least one inflator includes a flat annular plate forming the outer and inner flanges, said main body being located on the flat plate between the outer and inner flanges, said periphery of the outer bag being sandwiched between the flat annular plate and the retainer, and said periphery of the inner bag being fixed above the inner flange.

6. An airbag device according to claim 5, further comprising a ring disposed on the inner flange to fix the periphery of the inner bag between the inner flange and the ring.

7. An airbag device comprising:

a retainer having a center opening, and a plurality of side openings situated around the center opening, an airbag including an outer bag having an outer bag opening with a periphery, and an inner bag arranged inside the outer bag and having an inner bag opening with a periphery, said peripheries of the outer and inner bag openings being directly or indirectly fixed to the retainer so that the inner bag communicates with an outside of the airbag through the center opening of the retainer, and a plurality of small inflators directly fixed to the retainer and disposed in the side openings, each inflator having a main body containing a gas generating agent therein, said main body facing a space between the outer and inner bags to directly supply to the space gas when the inflator is actuated so that air is inspired inside the inner bag through the inner bag opening and the center opening.

8. An airbag device according to claim 7, further comprising an inner ring situated immediately outside the center opening to sandwich the periphery of the inner bag between the retainer and the inner ring, and an outer ring disposed outside the side openings to sandwich the periphery of the outer bag between the retainer and the outer ring.

* * * * *